United States Patent
Baek et al.

(10) Patent No.: US 10,061,642 B2
(45) Date of Patent: Aug. 28, 2018

(54) MEMORY DEVICE AND SYSTEM INCLUDING ON CHIP ECC CIRCUIT

(71) Applicant: SK hynix Inc., Icheon-si, Gyeonggi-do (KR)

(72) Inventors: Jin Ho Baek, Icheon-si (KR); Jang Ryul Kim, Icheon-si (KR); Il Park, Icheon-si (KR); Ho Kyoon Lee, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 35 days.

(21) Appl. No.: 15/061,412

(22) Filed: Mar. 4, 2016

(65) Prior Publication Data

US 2017/0123896 A1 May 4, 2017

(30) Foreign Application Priority Data

Nov. 2, 2015 (KR) .................. 10-2015-0153101

(51) Int. Cl.
*G06F 11/00* (2006.01)
*G06F 11/10* (2006.01)

(52) U.S. Cl.
CPC .......... *G06F 11/1044* (2013.01); *G06F 11/10* (2013.01); *G06F 11/1048* (2013.01); *G06F 11/1076* (2013.01)

(58) Field of Classification Search
CPC ............. G06F 11/1044; G06F 11/1076; G06F 11/1068; G06F 11/1048; G06F 11/0766; G06F 11/10; G11C 16/20; G11C 16/0483; G11C 29/12
USPC ....... 714/763, 764, 765, 773, 774, 799, 800, 714/4.5, 6.1, 6.11, 6.2, 6.21, 6.24, 21, 46
See application file for complete search history.

(56) References Cited

U.S. PATENT DOCUMENTS

| 8,683,299 B2 | 3/2014 | Gunnam et al. | |
|---|---|---|---|
| 2013/0179751 A1* | 7/2013 | Linstadt | G06F 11/1048 714/763 |
| 2013/0198587 A1* | 8/2013 | Kim | G06F 11/1048 714/763 |
| 2016/0357630 A1* | 12/2016 | Kang | G11C 5/025 |

FOREIGN PATENT DOCUMENTS

KR     1020090099757 A     9/2009

* cited by examiner

*Primary Examiner* — Christine T. Tu
(74) *Attorney, Agent, or Firm* — William Park & Associates Ltd.

(57) ABSTRACT

An on-chip logic block may include a host ECC circuit configured to correct an error based on host parity. The on-chip logic block may include a memory ECC circuit configured to correct an error based on memory parity.

16 Claims, 6 Drawing Sheets

MEMORY DEVICE AND SYSTEM INCLUDING ON CHIP ECC CIRCUIT

CROSS-REFERENCES TO RELATED APPLICATION

The present application claims priority under 35 U.S.C. § 119(a) to Korean application number 10-2015-0153101, filed on Nov. 2, 2015, in the Korean Intellectual Property Office, which is incorporated herein by reference in its entirety.

BACKGROUND

1. Technical Field

Various embodiments generally relate to a on chip logic block, system, and memory device and, more particularly, to a on chip logic block, system, and memory device including an ECC (error correction code) circuit.

2. Related Art

In general, in a memory device and a system, an ECC (error correction code) function is used to detect and correct an error likely to occur in the course of storing or reading data. An ECC algorithm may include a hamming code scheme capable of correcting an error of 1 bit per unit data or a BCH code scheme capable of correcting an error of plural bits. The ECC function is used in both a DRAM as a representative volatile memory device and a flash memory as a representative nonvolatile memory device.

Generally, an ECC circuit, which performs the ECC function, may generate and store not only data bits but also parity bits, determine whether an error occurs in data to be written or read, by using the parity bits, and correct an error which has occurred. A general ECC operation may be performed between a host and a memory device.

Recently, a 3D memory device in which a plurality of chips are stacked to form a single memory device is being developed to increase data storage capacities. With this development, the bandwidths of the memory devices are being significantly increased. Therefore, it may be necessary that an ECC operation be performed in a memory device regardless of a host.

SUMMARY

In an embodiment, a memory device may be provided. The memory device may include an on-chip logic block. The memory device may include a core region configured to store data outputted from the on-chip logic block. The on-chip logic block may include a host ECC circuit configured to perform a host-side ECC operation. The on-chip logic block may include a memory ECC circuit configured to perform a memory-side ECC operation.

In an embodiment, a memory device may be provided. The memory device may include a logic die. The memory device may include a plurality of memory dies stacked together with the logic die. The logic die may include a host ECC circuit configured to perform a host-side ECC operation. The logic die may include a memory ECC circuit configured to perform a memory-side ECC operation.

In an embodiment, a system may be provided. The system may include a host and a memory device configured to communicate with the host. The memory device may include an on-chip logic block. The memory device may include a core region configured to store data outputted from the on-chip logic block. The on-chip logic block may include a first host ECC circuit configured to perform a host-side ECC operation. The on-chip block may include a memory ECC circuit configured to perform a memory-side ECC operation.

In an embodiment, an on-chip logic block may be provided. The on-chip logic block may include a host ECC circuit configured to correct an error based on host parity. The on-chip logic block may include a memory ECC circuit configured to correct an error based on memory parity.

DETAILED DESCRIPTION

Various embodiments may be directed to an on-chip ECC (error correction code) circuit capable of performing both a host-side ECC operation and a memory-side ECC operation and thereby may decrease a parity capacity to be stored in a memory device, and a memory device and a system including the same.

Hereinafter, a memory device and a system including an on-chip ECC (error correction code) circuit may be described below with reference to the accompanying drawings through various examples of embodiments.

Figure 1:
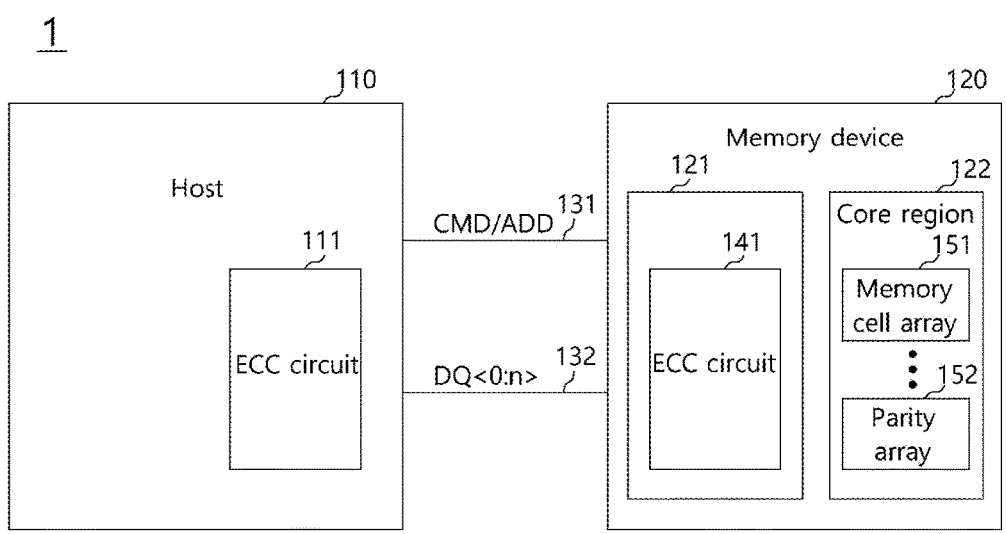
FIG. 1 is a diagram illustrating a representation of an example of the configuration of a system in accordance with an embodiment.

FIG. 1 is a diagram illustrating a representation of an example of the configuration of a system 1 in accordance with an embodiment. Referring to FIG. 1, the system 1 may include a host 110 and a memory device 120. The host 110 controls the memory device 120 such that the memory device 120 may perform various operations. The host 110 and the memory device 120 may perform data communication. For example, the host 110 may include a central processing unit (CPU), a graphic processing unit (GPU), a memory controller, a multimedia processor (MMP) or a digital signal processor (DSP). The host 110 may be realized in the form of a system-on-chip (SoC) by combining processor chips having various functions, such as application processors. The memory device 120 may include a volatile memory and a nonvolatile memory. The volatile memory may include an SRAM (static RAM), a DRAM (dynamic RAM) or an SDRAM (synchronous DRAM), and the nonvolatile memory may include a ROM (read only memory), a PROM (programmable ROM), an EEPROM (electrically erasable and programmable ROM), an EPROM (electrically programmable ROM), a flash memory, a PRAM (phase change RAM), an MRAM (magnetic RAM), an RRAM (resistive RAM) or an FRAM (ferroelectric RAM).

The host 110 and the memory device 120 may communicate with each other by being coupled through a plurality of buses. For example, the host 110 and the memory device 120 may be coupled through a command/address bus 131 and a data bus 132. The host 110 may provide commands/address signals CMD/ADD to the memory device 120 through the command/address bus 131, to control the operation of the memory device 120. A data stream DQ<0:n> may be transmitted through the data bus 132 in both directions. For example, in a write operation of the memory device 120, the host 110 may transmit commands/address signals CMD/ADD and a data stream DQ<0:n> to the memory device 120. In a read operation of the memory device 120, the host 110 may transmit commands/address signals CMD/ADD to the memory device 120, and the memory device 120 may transmit a data stream DQ<0:n> to the host 110.

The host 110 may include a physical layer (not illustrated) as an interface circuit for communicating with the memory device 120. The host 110 may include an ECC circuit 111 for correcting an error likely to occur with the data of the data stream DQ<0:n> and performing coding. The data stream DQ<0:n> may include information on data for the host 110 to store in the memory device 120 and host parity.

The memory device 120 may include an on-chip logic block 121 and a core region 122. The on-chip logic block 121 may include various logic circuits for allowing the memory device 120 to smoothly perform data communication with the host 110. In an embodiment, the on-chip logic block 121 may be a physical layer as an interface circuit for allowing the memory device 120 to communicate with the host 110, but the kind and the function of the on-chip logic block 121 are not limited to such. The on-chip logic block 121 may include an ECC circuit 141 which corrects an error likely to occur in data on the data stream DQ<0:n> transmitted and received between the host 110 and the memory device 120 and performs coding and which corrects an error likely to occur in data transmitted and received between the on-chip logic block 121 and the core region 122 and performs coding. In an embodiment, a data bandwidth between the host 110 and the memory device 120 may be different from a data bandwidth in the memory device 120, that is, between the on-chip logic block 121 and the core region 122.

The core region 122 may store data on the data stream DQ<0:n> transmitted from the host 110. The core region 122 may include a plurality of memory cell arrays 151 for storing data and a plurality of parity arrays 152 for storing parity used for an ECC operation. Parity information may have a capacity smaller than data information, and thus, the area and capacity of the plurality of memory cell arrays 151 may be larger than the area and capacity of the plurality of parity arrays 152.

The ECC circuit 141 may perform both a host-side ECC operation and a memory-side ECC operation. The ECC circuit 141 may include an algorithm capable of performing an operation corresponding to the ECC circuit 111, and may include an algorithm for performing the ECC operation of the memory device 120. For example, when the data stream DQ<0:n> is transmitted from the host 110 to the memory device 120, the ECC circuit 141 may decode the data stream DQ<0:n> and generate data in which host parity is not included. The ECC circuit 141 may encode the data in which the host parity is not included, with memory parity, and output resultant data to the core region 122. Therefore, the data in which the host parity is not included may be stored in the memory cell arrays 151, and the memory parity may be stored in the parity arrays 152. When the data stream DQ<0:n> is transmitted from the memory device 120 to the host 110, the ECC circuit 141 may decode data outputted from the core region 122 and generate data in which memory parity is not included The ECC circuit 141 may encode the data in which the memory parity is not included, with host parity, and generate the data stream DQ<0:n>. In the case where the ECC circuit 141 does not perform the host-side ECC operation, data outputted from the ECC circuit 141 may include both information on data for the host 110 to store in the memory device 120 and information on host parity and memory parity. Therefore, a larger storage space for storing the parity may be needed. In an embodiment, the ECC circuit 141 performs both the memory-side ECC operation and the host-side ECC operation, such that it is not necessary for the host parity to be stored in the core region 122.

Figure 2:
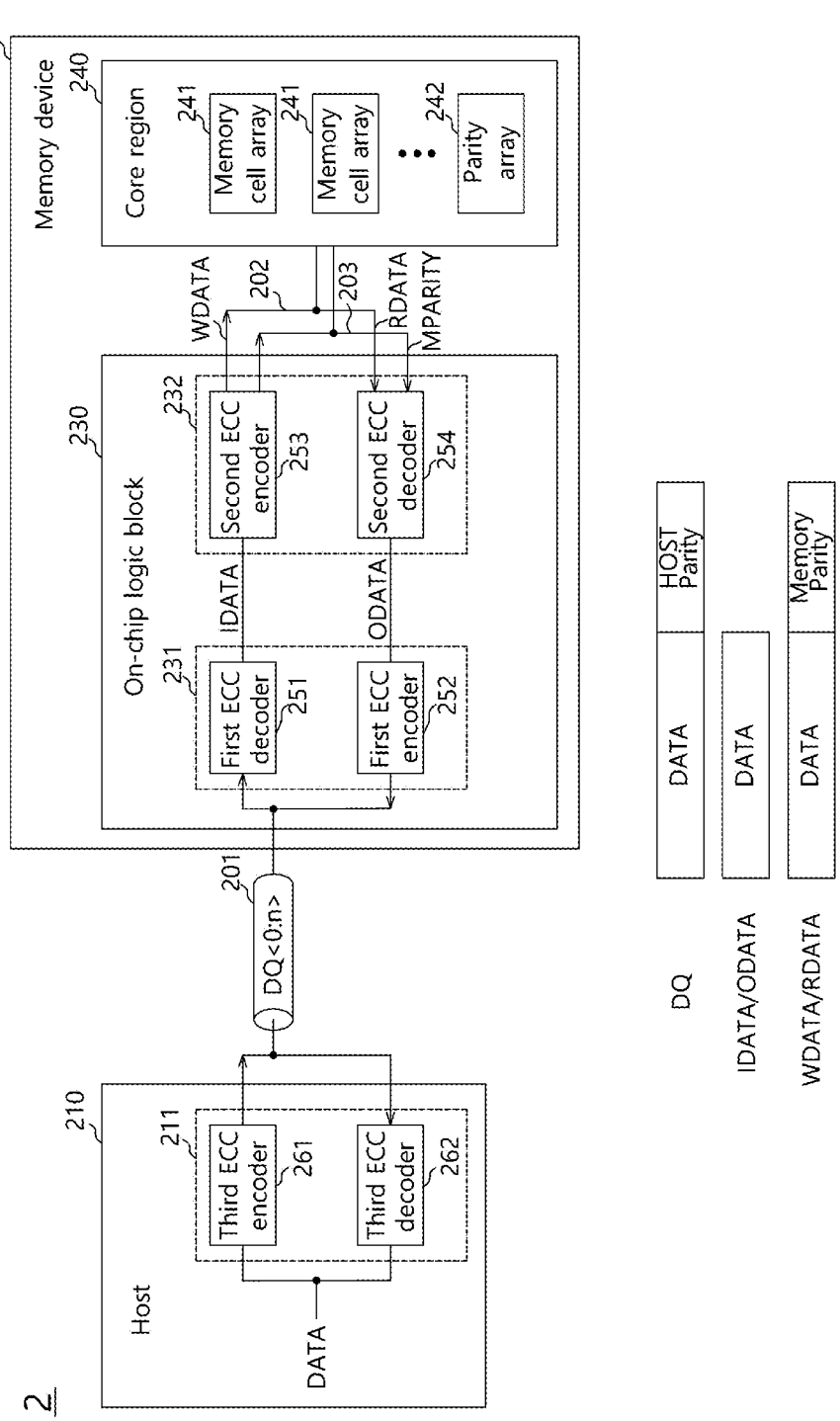
FIG. 2 is a diagram illustrating a representation of an example of the configuration of a system in accordance with an embodiment.

FIG. 2 is a diagram illustrating a representation of an example of the configuration of a system 2 in accordance with an embodiment. The system 2 may be applied to the system 1 illustrated in FIG. 1. Referring to FIG. 2, the system 2 may include a host 210 and a memory device 220. The host 210 and the memory device 220 may perform data communication by being coupled with each other through an external data bus 201. The memory device 220 may include an on-chip logic block 230 and a core region 240. The core region 240 may include memory cell arrays 241 for storing data and parity arrays 242 for storing parity used for an ECC operation. The parity arrays 242 may occupy a relatively smaller space and have a smaller capacity than the memory cell arrays 241.

The on-chip logic block 230 may include an on-chip ECC circuit. The on-chip ECC circuit may include a first host ECC circuit 231 and a memory ECC circuit 232. The first host ECC circuit 231 may perform a host-side ECC operation. The host-side ECC operation may be an operation for correcting an error likely to occur in data on a data stream DQ<0:n> transmitted through the external data bus 201, based on host parity, and performing coding. The memory ECC circuit 232 may perform a memory-side ECC operation. The memory-side ECC operation may be an operation for correcting an error likely to occur in write data WDATA and read data RDATA transmitted through an internal data bus 202, based on memory parity, and performing coding. A data bandwidth of the external data bus 201 may be different from a data bandwidth of the internal data bus 202.

The first host ECC circuit 231 may include a first ECC decoder 251 and a first ECC encoder 252. The first ECC decoder 251 may decode the data stream DQ<0:n> transmitted from the host 210 through the external data bus 201, and generate input data IDATA. The data stream DQ<0:n> may include information corresponding to data DATA for the host 210 to store in the memory device 220 and information corresponding to host parity. The first ECC decoder 251 may detect whether an error has occurred in data on the data stream DQ<0:n>, by using the host parity, correct the occurred error, and generate the input data IDATA. The first ECC encoder 252 may encode output data ODATA, and generate the data stream DQ<0:n> to be transmitted to the host 210 through the external data bus 201. The first ECC encoder 252 may encode the output data ODATA and host parity, and generate the data stream DQ<0:n>. The host parity may be generated based on the output data ODATA according to an algorithm of the first host ECC circuit 231. Accordingly, the data stream DQ<0:n> outputted from the first ECC encoder 252 may include information corresponding to the output data ODATA and information corresponding to the host parity.

The memory ECC circuit 232 may include a second ECC encoder 253 and a second ECC decoder 254. The second ECC encoder 253 may receive the input data IDATA from the first ECC decoder 251. The second ECC encoder 253 may encode the input data IDATA, and generate the write data WDATA and memory parity is MPARITY. The memory parity MPARITY may be generated based on the input data IDATA according to an algorithm of the memory ECC circuit 232. The write data WDATA may be transmitted to the core region 240 through the internal data bus 202. The memory parity MPARITY may be transmitted to the core region 240 through a separate ECC line 203. In an embodiment, the memory parity MPARITY may be transmitted together with the write data WDATA to the core region 240 through the internal data bus 202. The write data WDATA may be stored in the memory cell arrays 241 of the core region 240, and the memory parity MPARITY may be stored in the parity arrays 242.

The second ECC decoder 254 may decode the read data RDATA and memory parity MPARITY, and generate the output data ODATA. The read data RDATA may be outputted through the internal data bus 202 from the core region 240. The memory parity MPARITY may be outputted through the ECC line 203 from the core region 240. The output data ODATA may be inputted to the first ECC encoder 252. The second ECC decoder 254 may detect whether an error has occurred in the read data RDATA outputted from the core region 240, based on the memory parity MPARITY, correct the occurred error, and generate the output data ODATA.

Referring to FIG. 2, the host 210 may include a second host ECC circuit 211. The second host ECC circuit 211 may perform a host-side ECC operation. The second host ECC circuit 211 may include a third ECC encoder 261 and a third ECC decoder 262. The second host ECC circuit 211 may perform the same algorithm as the first host ECC circuit 231. Therefore, the third ECC encoder 261 may be configured to perform substantially the same function as the first ECC encoder 252, and the third ECC decoder 262 may be configured to perform substantially the same function as the first ECC decoder 251.

The third ECC encoder 261 may receive data DATA for the host 210 to store in the memory device 220, and generate the data stream DQ<0:n> to be transmitted to the memory device 220 through the external data bus 201. The third ECC encoder 261 may encode the data DATA and host parity, and generate the data stream DQ<0:n>. The third ECC decoder 262 may receive the data stream DQ<0:n> transmitted from the memory device 220 through the external data bus 201. The third ECC decoder 262 may detect whether an error has occurred in data on the data stream DQ<0:n>, based on host parity, correct the occurred error, and generate the data DATA.

In general, a conventional on-chip ECC circuit provided in the on-chip logic block 230 may include only an ECC circuit which performs a memory-side ECC operation. Therefore, the conventional on-chip ECC circuit generates write data WDATA which includes all of information corresponding to data, information corresponding to host parity and information corresponding to memory parity. Thus, since parity arrays for storing both host parity and memory parity should be provided, a problem is caused in that the area and capacity of memory cell arrays for storing data cannot help but be decreased. In the system 2 in accordance with an embodiment, the on-chip logic block 230 includes the on-chip ECC circuit which may perform both the host-side ECC operation and the memory-side ECC operation. Hence, the write data WDATA provided from the on-chip logic block 230 to the core region 240 may include only information corresponding to memory parity, and may not include information corresponding to host parity. Accordingly, the core region 240 may store only memory parity, and does not store host parity. Due to this fact, as a storage space for storing parity may be minimized, the area of memory cell arrays where data may be stored may be secured. Moreover, since the on-chip ECC circuit generates the write data WDATA by performing the memory-side ECC operation for a result of performing the host-side ECC operation, an efficient ECC operation may be performed, and data communication precision between the host 210 and the memory device 220 may be improved.

Figure 3:
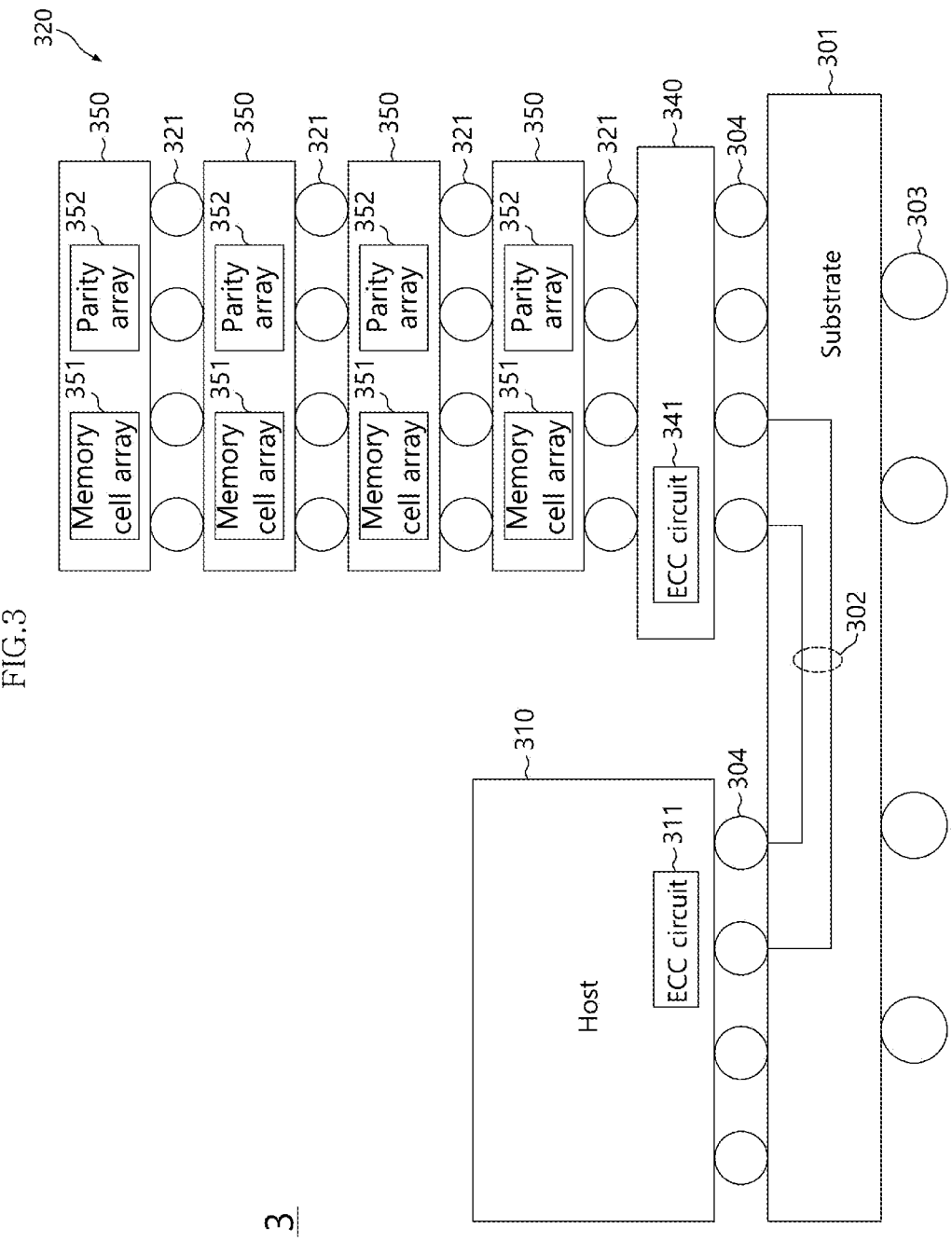
FIG. 3 is a diagram illustrating a representation of an example of the configuration of a system in accordance with an embodiment.

FIG. 3 is a diagram illustrating a representation of an example of the configuration of a system 3 in accordance with an embodiment. Referring to FIG. 3, the system 3 may include a substrate 301, a host 310, and a memory device 320. The system 3 may be realized in the type of a system-in-package, a multi-chip package or a system-on-chip, and may be realized in the type of a package-on-package which includes a plurality of packages.

The substrate 301 may provide signal paths 302 for smooth data communication between the host 310 and the memory device 320, and may include a logic circuit for providing the signal paths 302 and a logic circuit for a test. The signal paths 302 may include a plurality of buses. For example, the signal paths 302 may include a data bus, a command bus, a command/address bus, a clock bus, and so forth. The substrate 301 may be realized in various types such as of an interposer and a PCB (printed circuit board). The signal paths 302 provided by the substrate 301 may include electrical coupling paths such as a metal layer or through-silicon vias.

The substrate 301 may be electrically coupled with an external device through package balls 303 such as a ball grid array, bump balls and C4 bumps. The external device may be an external host which operates by being coupled with the system 3. The substrate 301 may be electrically coupled with the host 310 and the memory device 320 through micro bumps 304.

The host 310 may perform a calculating operation for controlling the memory device 320. The host 310 may include at least one among a central processing unit (CPU), a graphic processing unit (GPU), a multimedia processor (MMP), a digital signal processor (DSP) and a memory controller. The host 310 may be formed by combining processor chips having various functions, such as application processors (AP). The host 310 may include a physical layer for communicating with the memory device 320. The host 310 may perform data communication with the memory device 320 by transmitting and receiving a data stream through the signal paths 302. The host 310 may include an ECC circuit 311 for correcting an error likely to occur in data on the data stream and performing coding.

The memory device 320 may be a 3D memory device in which a plurality of dies are stacked. The memory device 320 may include a logic die 340 and a plurality of memory dies 350. The logic die 340 may be stacked on the substrate 301 through the micro bumps 304, and the plurality of memory dies 350 may be sequentially stacked on the logic die 340 through micro bumps 321. The logic die 340 and the plurality of memory dies 350 may be packaged as a single package, and may construct a single memory device. The logic die 340 may be electrically coupled with the plurality of memory dies 350 through electrical connection means such as wires and/or through-silicon vias.

The plurality of memory dies 350 may include memory cell arrays 351 as data storage spaces for storing data and parity arrays 352 for storing parity. The logic die 340 may include or not include memory cell arrays and parity arrays. The memory dies 350 may store data transmitted from the logic die 340 or output stored data to the logic die 340, by being controlled by the logic die 340. The logic die 340 may relay communication between the host 310 and the plurality of memory dies 350. The logic die 340 transmits data outputted from the plurality of memory dies 350, to the host 310, and inputs data transmitted from the host 310, to the plurality of memory dies 350. The logic die 340 may include an ECC circuit 341 which corrects an error likely to occur in data on the data stream transmitted and received between the host 310 and the memory device 320 and performs coding and which corrects an error likely to occur in data transmitted and received between the logic die 340 and the plurality of memory dies 350 and performs coding.

Figure 4:
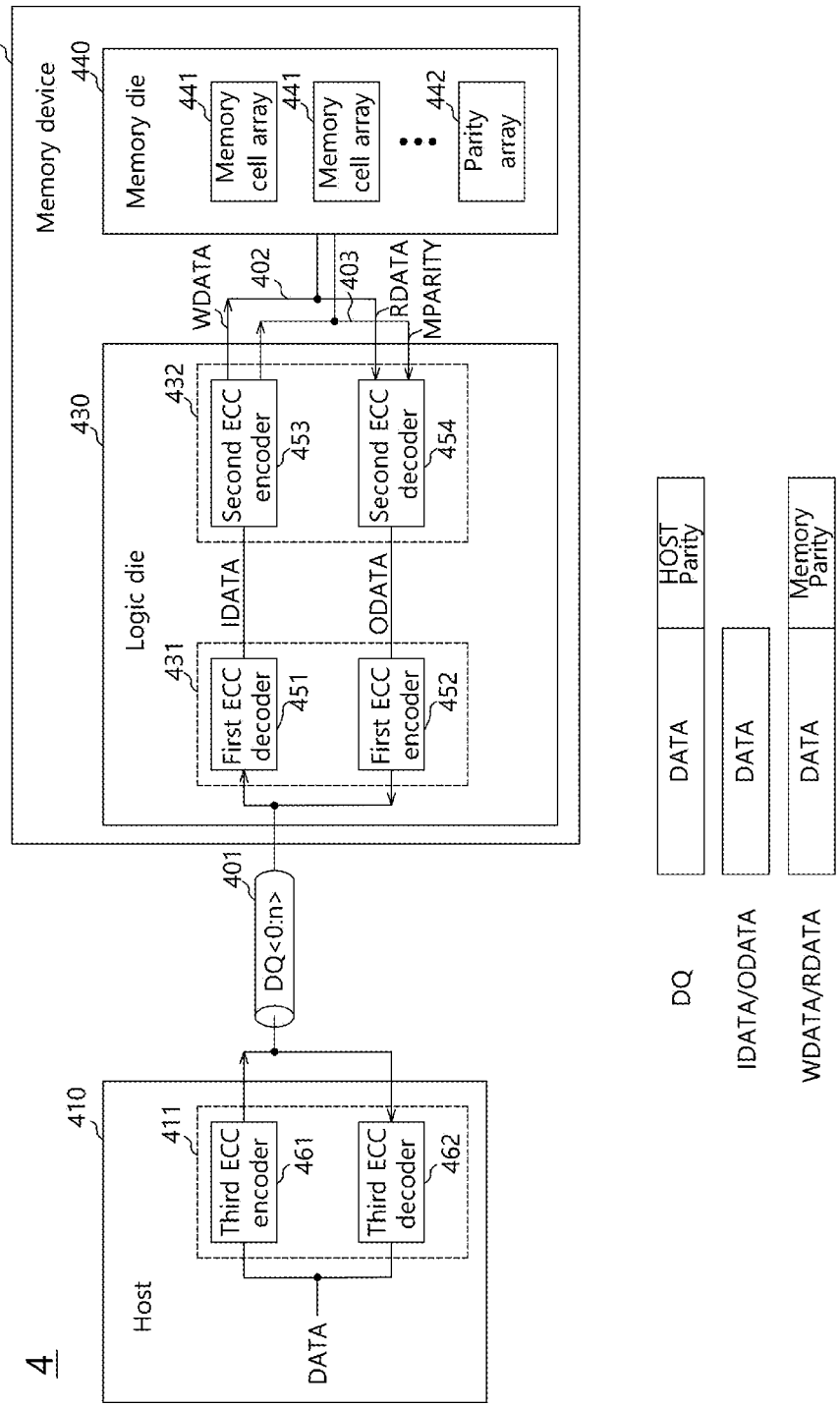
FIG. 4 is a diagram illustrating a representation of an example of the configuration of a system in accordance with an embodiment.

FIG. 4 is a diagram illustrating a representation of an example of the configuration of a system 4 in accordance with an embodiment. The system 4 may be applied to the system 3 illustrated in FIG. 3. Referring to FIG. 4, the system 4 may include a host 410 and a memory device 420. The host 410 and the memory device 420 may perform data communication by being coupled with each other through an external data bus 401. The memory device 420 may include a logic die 430 and a memory die 440. The memory die 440 may include memory cell arrays 441 for storing data and parity arrays 442 for storing parity used for an ECC operation.

The logic die 430 may include an on-chip ECC circuit. The on-chip ECC circuit may include a first host ECC circuit 431 and a memory ECC circuit 432. The first host ECC circuit 431 and the memory ECC circuit 432 may perform substantially the same operations and functions as the first host ECC circuit 231 and the memory ECC circuit 232 illustrated in FIG. 2.

The first host ECC circuit 431 may include a first ECC decoder 451 and a first ECC encoder 452. The first ECC decoder 451 may decode a data stream DQ<0:n> transmitted from the host 410 through the external data bus 401, and generate input data IDATA. The first ECC decoder 451 may detect whether an error has occurred in data on the data stream DQ<0:n>, by using host parity, correct the occurred error, and generate the input data IDATA. The first ECC encoder 452 may encode output data ODATA, and generate the data stream DQ<0:n> to be transmitted to the host 410 through the external data bus 401. The first ECC encoder 452 may encode the output data ODATA and host parity, and generate the data stream DQ<0:n>. The host parity may be generated based on the output data ODATA according to an algorithm of the first host ECC circuit 431. Accordingly, the data stream DQ<0:n> outputted from the first ECC encoder 452 may include information corresponding to the output data ODATA and information corresponding to the host parity.

The memory ECC circuit 432 may include a second ECC encoder 453 and a second ECC decoder 454. The second ECC encoder 453 may receive the input data IDATA from the first ECC decoder 451. The second ECC encoder 453 may encode the input data IDATA, and generate write data WDATA and memory parity MPARITY. The memory parity MPARITY may be generated based on the input data IDATA according to an algorithm of the memory ECC circuit 432. The write data WDATA may be transmitted to the memory die 440 through an internal data bus 402. The memory parity MPARITY may be transmitted to the memory die 440 through a separate ECC line 403. The write data WDATA may be stored in the memory cell arrays 441 of the memory die 440, and the memory parity MPARITY may be stored in the parity arrays 442.

The second ECC decoder 454 may decode read data RDATA and memory parity MPARITY, and generate the output data ODATA. The read data RDATA may be outputted through the internal data bus 402 from the memory die 440. The memory parity MPARITY may be outputted through the ECC line 403 from the memory die 440. The output data ODATA may be inputted to the first ECC encoder 452. The second ECC decoder 454 may detect whether an error has occurred in the read data RDATA outputted from the memory die 440, based on the memory parity MPARITY, correct the occurred error, and generate the output data ODATA.

Referring to FIG. 4, the host 410 may include a second host ECC circuit 411. The second host ECC circuit 411 may perform a host-side ECC operation. The second host ECC circuit 411 may perform substantially the same function and operation as the second host ECC circuit 211 of FIG. 2. The second host ECC circuit 411 may include a third ECC encoder 461 and a third ECC decoder 462. The second host ECC circuit 411 may perform the same algorithm as the first host ECC circuit 431. Therefore, the third ECC encoder 461 may be configured to perform substantially the same function as the first ECC encoder 452, and the third ECC decoder 462 may be configured to perform substantially the same function as the first ECC decoder 451.

The third ECC encoder 461 may receive data DATA for the host 410 to store in the memory device 420, and generate the data stream DQ<0:n> to be transmitted to the memory device 420 through the external data bus 401. The third ECC encoder 461 may encode the data DATA and host parity, and generate the data stream DQ<0:n>. The third ECC decoder 462 may receive the data stream DQ<0:n> transmitted from the memory device 420 through the external data bus 401. The third ECC decoder 462 may detect whether an error has occurred in data on the data stream DQ<0:n>, based on host parity, correct the occurred error, and generate the data DATA.

Figure 5:
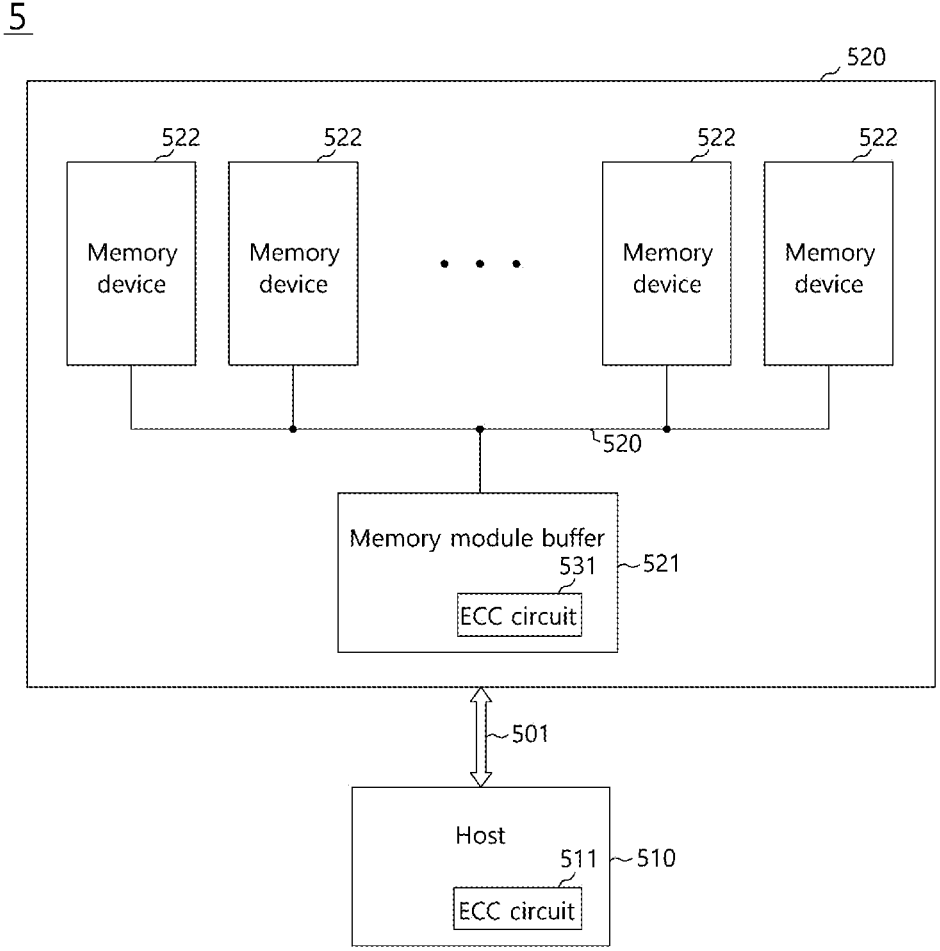
FIG. 5 is a diagram illustrating a representation of an example of the configuration of a system in accordance with an embodiment.

FIG. 5 is a diagram illustrating a representation of an example of the configuration of a system 5 in accordance with an embodiment. Referring to FIG. 5, the system 5 may include a host 510 and a memory module 520. The host 510 and the memory module 520 may perform data communication by being coupled with each other through a plurality of buses including an external data bus 501. The memory module 520 may include a memory module buffer 521 and a plurality of memory devices 522. The memory module buffer 521 may relay signals transmitted between the host 510 and the plurality of memory devices 522. The memory module buffer 521 may be coupled with the plurality of memory devices 522 through an internal data bus 502. A data bandwidth of the external data bus 501 may be different from a data bandwidth of the internal data bus 502. The data bandwidth of the internal data bus 502 may be different from a data bandwidth of data transmission lines in the memory devices 522.

The memory module buffer 521 may include various logic circuits which allow the host 510 and the plurality of memory devices 522 to communicate. The memory module buffer 521 may be an advanced memory buffer including various logic circuits. The memory module buffer 521 may include an ECC circuit 531. The ECC circuit 531 may perform both a host-side ECC operation and a memory-side ECC operation. The host 510 may include an ECC circuit 511. The ECC circuit 511 may perform a host-side ECC operation.

Figure 6:
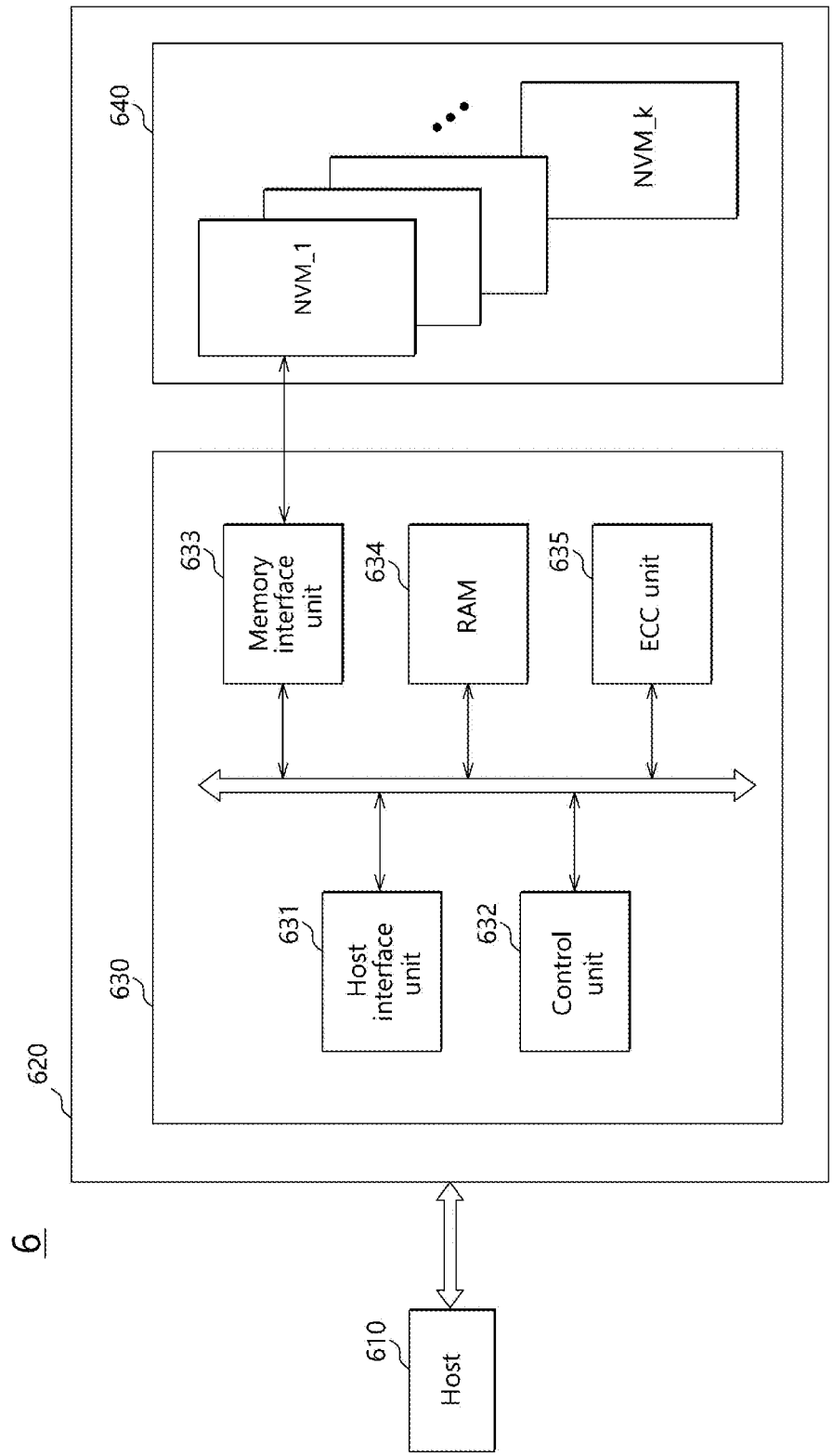
FIG. 6 is a diagram illustrating a representation of an example of the configuration of a system in accordance with an embodiment.

FIG. 6 is a diagram illustrating a representation of an example of the configuration of a system 6 in accordance with an embodiment. The system 6 may include a host 610 and a data storage device 620. The data storage device 620 may include a controller 630 and a nonvolatile memory device 640. The data storage device 620 may be used by being coupled to the host 610 such as a mobile phone, an MP3 player, a laptop computer, a desktop computer, a game player, a TV, an in-vehicle infotainment system, and so forth.

The controller 630 may be configured to access the nonvolatile memory device 640 in response to a request from the host 610. For example, the controller 630 may be configured to control a read, program or erase operation of the nonvolatile memory device 640. The controller 630 may be configured to drive a to firmware or a software for controlling the nonvolatile memory device 640.

The controller 630 may include a host interface unit 631, a control unit 632, a memory interface unit 633, a RAM 634, and an ECC unit 635. The control unit 632 may be configured to control general operations of the controller 630 in response to a request from the host 610.

The RAM 634 may be used as the working memory of the control unit 632. The RAM 634 may be used as a buffer memory which temporarily stores data read from the nonvolatile memory device 640 or data provided from the host 610.

The host interface unit 631 may be configured to interface the host 610 and the controller 630. For example, the host interface unit 631 may be configured to communicate with the host 610 through one of various interface protocols such as a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, and a serial attached SCSI (SAS) protocol.

The memory interface unit 633 may be configured to interface the controller 630 and the nonvolatile memory device 640. The memory interface unit 633 may be configured to provide commands and address signals to the nonvolatile memory device 640. Furthermore, the memory interface unit 633 may be configured to exchange data with the nonvolatile memory device 640.

The ECC unit 635 may be configured to detect an error of the data read from the nonvolatile memory device 640. Also, the ECC unit 635 may be configured to correct a detected error when the detected error is within a correctable range. The ECC unit 635 may perform both a host-side ECC operation and a memory-side ECC operation. The ECC unit 635 may include a configuration for performing substantially the same operations and functions as the first host ECC circuit 231 and the memory ECC circuit 232 illustrated in FIG. 2. The ECC unit 635 may be or include an on-chip ECC circuit.

The nonvolatile memory device 640 may be used as a storage medium of the data storage device 620. The nonvolatile memory device 640 may include a plurality of nonvolatile memory chips (or dies) NVM_1 to NVM_k. The nonvolatile memory device 640 may include all kinds of nonvolatile memory devices capable of communicating with a host through a controller, such as a flash memory, a PRAM (phase change RAM), an MRAM (magnetic RAM), an RRAM (resistive RAM) and an FRAM (ferroelectric RAM).

The controller 630 and the nonvolatile memory device 640 may be manufactured as any one of various data storage devices. For example, the controller 630 and the nonvolatile memory device 640 may be integrated into one semiconductor device and may be manufactured as any one of a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and so forth.

While various embodiments have been described above, it will be understood to those skilled in the art that the embodiments described are examples only. Accordingly, the memory device and the system including an on-chip ECC circuit described herein should not be limited based on the described embodiments.

What is claimed is:

1. A memory device comprising:
an on-chip logic block; and
a core region,
the on-chip logic block comprising:
a host error correction code (ECC) circuit configured to decode a data stream which includes information on data to be stored in the memory device and host parity to generate input data, and encode output data and the host parity to generate the data stream which includes information on the output data and information corresponding to the host parity; and
a memory ECC circuit configured to encode the input data to generates write data and memory parity, and decode read data and the memory parity to generate the output data,
wherein the write data and the memory parity are stored to the core region, and the read data and the memory parity are outputted from the core region.

2. The memory device according to claim 1, wherein the host ECC circuit comprises:
a first ECC decoder configured to decode the data stream transmitted from a host, and generate the input data; and
a first ECC encoder configured to encode the output data, and generate the data stream to be outputted to the host.

3. The memory device according to claim 2, wherein the memory ECC circuit comprises:
a second ECC encoder configured to encode the input data, and generate the write data and the memory parity; and
a second ECC decoder configured to decode the read data and the memory parity, and generate the output data.

4. The memory device according to claim 1, wherein the core region comprises:
memory cell arrays each configured to store the write data; and
parity arrays each configured to store the memory parity.

5. The memory device according to claim 4, wherein the core region does not store the host parity.

6. A memory device comprising:
a logic die; and
a plurality of memory dies stacked together with the logic die,
the logic die comprising:
a host error correction code (ECC) circuit configured to decode a data stream which includes information on data to be stored in the memory device and host parity to generate input data, and encode output data and the host parity to generate the data stream which includes information on the output data and information corresponding to the host parity; and a memory ECC circuit configured to encode the input data to generates write data and memory parity, and decode read data and the memory parity to generate the output data, wherein the write data and the memory parity are stored to the logic die, and the read data and the memory parity are outputted from the logic die.

7. The memory device according to claim 6, wherein the host ECC circuit comprises:

a first ECC decoder configured to decode the data stream transmitted from a host, and generate the input data; and a first ECC encoder configured to encode the output data, and generate the data stream to be outputted to the host.

8. The memory device according to claim 7, wherein the memory ECC circuit comprises:

a second ECC encoder configured to encode the input data, and generate the write data and the memory parity; and a second ECC decoder configured to decode the read data and the memory parity, and generate the output data.

9. The memory device according to claim 6, wherein each memory die comprises:

memory cell arrays each configured to store the write data; and parity arrays each configured to store the memory parity.

10. The memory device according to claim 9, wherein the memory dies do not store the host parity.

11. A system including a host and a memory device configured to communicate with the host, the memory device comprising:

an on-chip logic block; and a core region configured to store data outputted from the on-chip logic block, the on-chip logic block comprising:

a first host error correction code (ECC) circuit configured to decode a data stream which includes information on data to be stored in the memory device and host parity to generate input data, and encode output data and the host parity to generate the data stream which includes information on the output data and information corresponding to the host parity; and a memory ECC circuit configured to encode the input data to generates write data and memory parity, and decode read data and the memory parity to generate the output data, wherein the write data and the memory parity are stored to the core region, and the read data and the memory parity are outputted from the core region.

12. The system according to claim 11, wherein the first host ECC circuit comprises:

a first ECC decoder configured to decode the data stream transmitted from the host, and generate the input data; and a first ECC encoder configured to encode the output data, and generate the data stream to be outputted to the host.

13. The system according to claim 12, wherein the memory ECC circuit comprises:

a second ECC encoder configured to encode the input data, and generate the write data and the memory parity; and a second ECC decoder configured to decode the read data and the memory parity, and generate the output data.

14. The system according to claim 13, wherein the host comprises:

a second host ECC circuit configured to perform a host-side ECC operation.

15. The system according to claim 14, wherein the second host ECC circuit comprises:

a third ECC encoder configured to encode data, and generate the data stream for transmitting to the memory device; and a third ECC decoder configured to decode the data stream transmitted from the memory device, and generate data.

16. The system according to claim 11, wherein a data bandwidth between the host and the memory device is different from a data bandwidth in the memory device.

* * * * *